(12) United States Patent
Sonoda

(10) Patent No.: US 9,082,185 B2
(45) Date of Patent: Jul. 14, 2015

(54) INFORMATION PROCESSING APPARATUS, PROCESSING METHOD THEREFOR, AND NON-TRANSITORY COMPUTER-READABLE STORAGE MEDIUM

(75) Inventor: Tetsuri Sonoda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 538 days.

(21) Appl. No.: 13/039,769

(22) Filed: Mar. 3, 2011

(65) Prior Publication Data

US 2011/0221891 A1 Sep. 15, 2011

(30) Foreign Application Priority Data

Mar. 10, 2010 (JP) ................................. 2010-053669

(51) Int. Cl.
*G06T 7/00* (2006.01)
*G01B 11/25* (2006.01)

(52) U.S. Cl.
CPC .......... *G06T 7/0057* (2013.01); *G01B 11/2513* (2013.01)

(58) Field of Classification Search
CPC ...... G01B 11/022; G01B 11/024; H04N 7/18; H04N 7/181; G01C 15/00
See application file for complete search history.

(56) References Cited

U.S. PATENT DOCUMENTS

| | | | |
|---|---|---|---|
| 5,852,672 A * | 12/1998 | Lu | 382/154 |
| 5,951,056 A | 9/1999 | Fukuda et al. | |
| 6,250,918 B1 | 6/2001 | Sachdeva et al. | |
| 7,768,656 B2 * | 8/2010 | Lapa et al. | 356/603 |
| 2010/0079263 A1 | 4/2010 | Anabuki et al. | |
| 2011/0081072 A1 * | 4/2011 | Kawasaki et al. | 382/154 |

FOREIGN PATENT DOCUMENTS

| | | |
|---|---|---|
| JP | 2001-101358 A | 4/2001 |
| JP | 2008-276743 A | 11/2008 |
| JP | 2009-300277 A | 12/2009 |

OTHER PUBLICATIONS

European Search Report dated Sep. 13, 2011 in corresponding European Patent Application No. 11156340.9.
Lavoie, P., et al., 3-D Object Model Recovery From 2-D Images Using Structured Light, IEEE Transactions on Instrumentation and Measurement, vol. 53, No. 2, pp. 437-443, 2004.

(Continued)

*Primary Examiner* — Dave Czekaj
*Assistant Examiner* — Nam Pham
(74) *Attorney, Agent, or Firm* — Fitzpatrick, Cella, Harper & Scinto

(57) ABSTRACT

An information processing apparatus generates pattern data including a plurality of measurement lines, and a reference line which has a plurality of intersection points with the plurality of measurement lines, respectively, and has a shape that is defined in an interval between the intersection points by a specific feature, captures an image of an object onto which projection pattern light, based on the generated pattern data, is projected, extracts the intersection points from the captured image, and obtains information, concerning the shape with a specific feature in the interval between the intersection points on the reference line in the captured image, as identification information used to identify the measurement lines.

22 Claims, 13 Drawing Sheets

(56) References Cited

OTHER PUBLICATIONS

Pages, J., et al., Implementation of a Robust Coded Structured Light Technique for Dynamic 3D Measurements, Institute of Informatics and Applications, University of Girona, pp. 1073-1076, 2003.

Le Moigne, J., et al., Structured Light Patterns for Robot Mobility, IEEE Journal of Robotics & Automation, vol. 4, No. 5, pp. 541-548, 1988.

Japanese Office Action dated Nov. 18, 2013 issued in corresponding Japanese Patent Application No. 2010-053669.

* cited by examiner

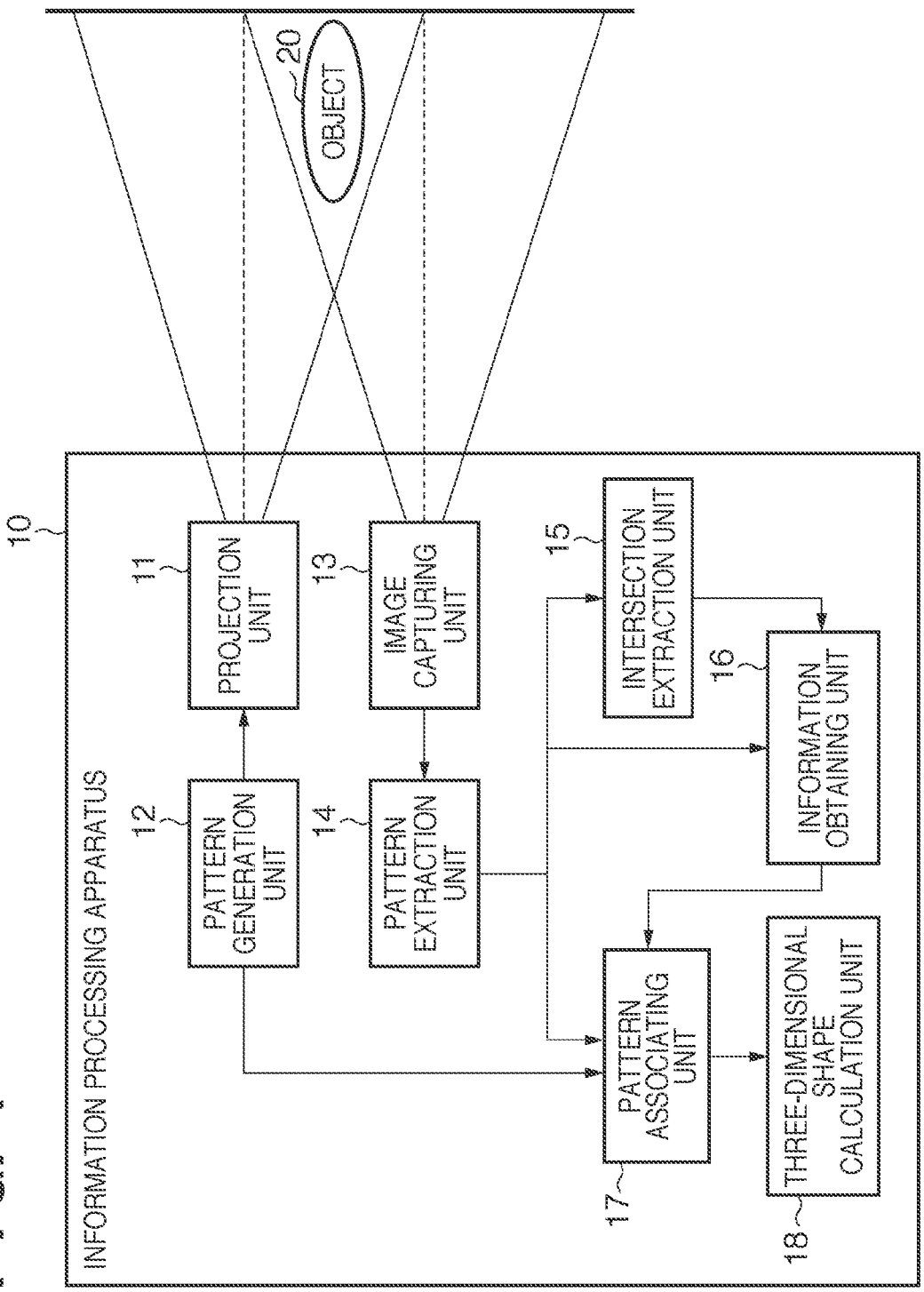

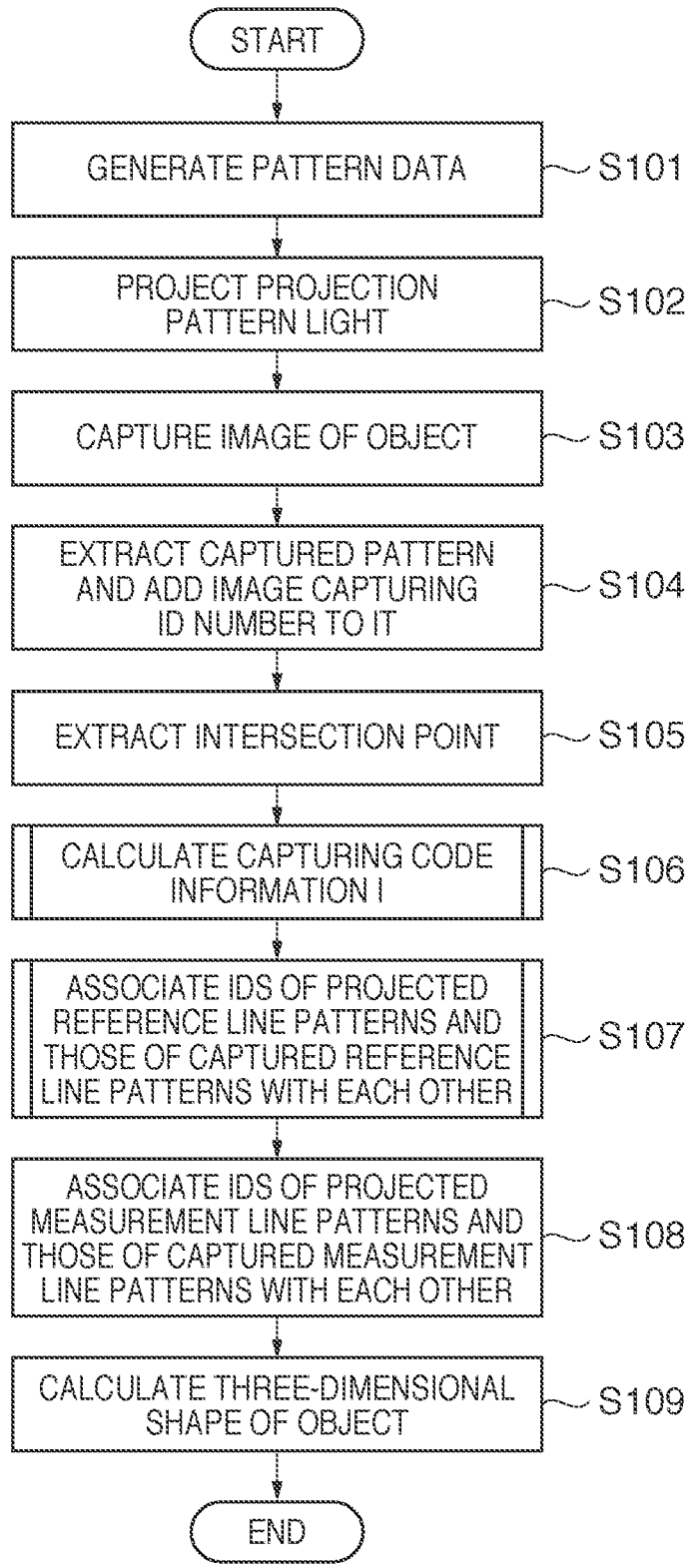

INFORMATION PROCESSING APPARATUS, PROCESSING METHOD THEREFOR, AND NON-TRANSITORY COMPUTER-READABLE STORAGE MEDIUM

BACKGROUND OF THE INVENTION

1. Field of the Invention

The present invention relates to an information processing apparatus, a processing method therefor, and a non-transitory computer-readable storage medium.

2. Description of the Related Art

Measurement apparatuses that measure the three-dimensional shapes of objects are known. Such measurement apparatuses are widely employed for, for example, component inspection in the industrial field and measuring the shape of a living body in the medical field. A measurement apparatus that uses a noncontact measurement method is especially effective when a target object may become deformed or damaged by a contact measurement method.

To measure a three-dimensional shape in a noncontact manner, a scheme that performs triangulation using an image captured by an image capturing apparatus is widely employed. In a technique described in, for example, Japanese Patent Laid-Open No. 2008-276743, a projection apparatus projects multi-slit light, to which a reference line pattern is added, onto an object, and an image capturing apparatus captures an image of the light reflected by the object. Thus, the three-dimensional shape is measured. More specifically, multi-slit light in which fine lines are aligned in parallel is projected as a measurement line pattern, and a reference line pattern with a feature added to the interval between the lines of the multi-slit light by changing their widths is projected. Using the feature of the reference line pattern, the two-dimensional position on the projection pattern and that in the captured image are associated with each other. Based on the result of association between these two-dimensional positions, respective lines which form the multi-slit light are associated with each other, and the three-dimensional shape is measured using triangulation by a light-section method.

In the above-mentioned technique, the reference line pattern added to the interval between the lines of the multi-slit light is generated by a pixel array with a relatively small area. It is very difficult to discriminate such a small-area pattern from noise in a captured image with a low S/N ratio.

In such a technique, a certain area must be allocated to the reference line pattern, so it is difficult to obtain multi-slit light with a relatively high density, thus making it impossible to accurately perform three-dimensional measurement of small objects.

SUMMARY OF THE INVENTION

The present invention provides a technique which can project a projection pattern for use in three-dimensional measurement of an object at a higher density.

The present invention in its first aspect provides an information processing apparatus comprising: a pattern generation unit arranged to generate pattern data including a plurality of measurement lines, and a reference line which has a plurality of intersection points with the plurality of measurement lines, respectively, and has a shape that is defined in an interval between the intersection points by a specific feature; an image capturing unit arranged to capture an image of the object onto which projection pattern light, based on the pattern data generated by the pattern generation unit, is projected; an intersection extraction unit arranged to extract the intersection points from the image captured by the image capturing unit; and an information obtaining unit arranged to obtain information, concerning the presence or absence of a specific feature in the interval between each adjacent pairs of intersection points on the reference line in the captured image, as identification information used to identify each measurement line in the plurality of measurement lines.

The present invention in its second aspect provides a processing method for an information processing apparatus, comprising: generating pattern data including a plurality of measurement lines, and a reference line which has a plurality of intersection points with each of the plurality of measurement lines, respectively, and has a shape that is defined in an interval between the intersection points by a specific feature; capturing an image of an object onto which projection pattern light, based on the pattern data is projected; extracting the intersection points from the captured image; and obtaining information, including the presence or absence of the specific feature in the interval between each pair of adjacent intersection points on the reference line in the captured image, as identification information used to identify each of the plurality of measurement lines.

The present invention in its third aspect provides a non-transitory computer-readable storage medium storing a program which, when loaded into a computer, causes the computer to become the above described information processing apparatus.

Further features of the present invention will become apparent from the following description of embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing an example of the configuration of an information processing apparatus according to an embodiment of the present invention;

FIG. 2 is a flowchart showing an example of the sequence of the operation of an information processing apparatus 10 shown in FIG. 1;

DESCRIPTION OF THE EMBODIMENTS

Figure 3A:
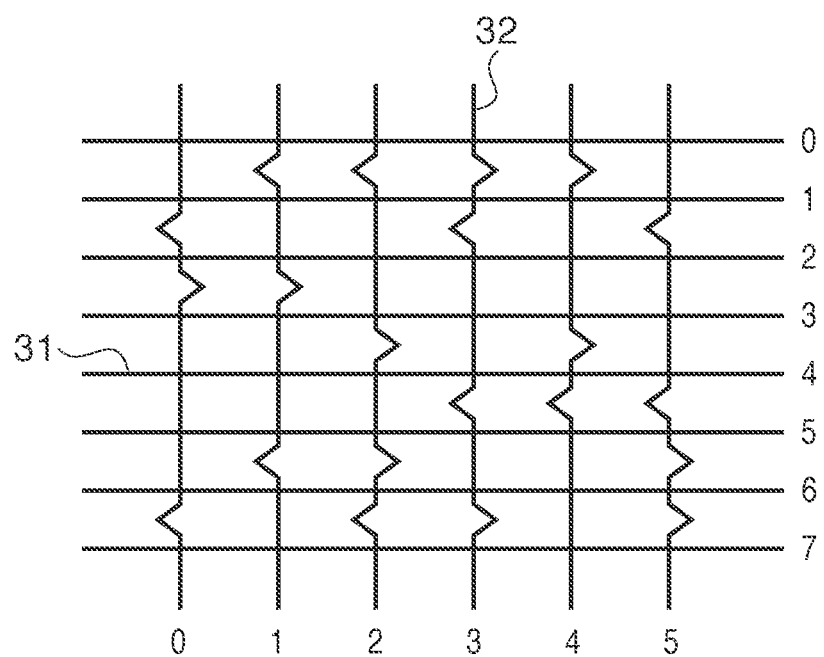
FIGS. 3A and 3B are views showing an example of pattern data in accordance with the present invention.

Embodiments of the present invention will now be described in detail, by way of example, with reference to the drawings.

FIG. 1 is a block diagram showing an example of the configuration of an information processing apparatus according to an embodiment of the present invention. Note that an information processing apparatus 10 includes a built-in computer. The computer includes, for example, a main control means such as a CPU, and storage means such as a ROM (Read Only Memory), a RAM (Random Access Memory), and an HDD (Hard Disk Drive). The computer may also include a user interface such as a button, a display, or a touch panel, and a communication means such as a network card. Note that these constituent means are connected to each other via a bus, and controlled by executing programs stored in the storage means by the main control means.

The information processing apparatus 10 includes a projection unit 11, pattern generation unit 12, image capturing unit 13, pattern extraction unit 14, intersection extraction unit 15, information obtaining unit 16, pattern associating unit 17, and three-dimensional shape calculation unit 18. Note that some or all of these constituent elements may be implemented by executing the programs stored in the ROM by the CPU or implemented using dedicated hardware.

The pattern generation unit 12 generates pattern data of projection pattern light. The pattern data includes reference line patterns (corresponding to vertical lines (32)) and measurement line patterns (corresponding to horizontal lines (31)); see FIGS. 3A & 3B. Each line 32 of the reference line pattern has a shape with a specific feature to identify each line of the reference line pattern and by association to identify each line 31 of the measurement line patterns.

The projection unit 11 is implemented by, for example, a projector, and projects projection pattern light based on the pattern data generated by the pattern generation unit 12 onto a physical object (an object 20) to be measured. The projection pattern light is projection light based on the pattern data, and therefore includes the projected reference line pattern and the projected measurement line pattern. The projected measurement lines 31 function as multi-slit light used to measure the shape of the object 20.

The image capturing unit 13 is implemented by, for example, a camera, and captures an image of the object 20, onto which the projection pattern light is projected. The pattern extraction unit 14 processes the image captured by the image capturing unit 13 to obtain a captured region (captured pattern) irradiated with the projection pattern light on the object 20. The pattern extraction unit 14 separates and extracts captured reference line patterns and captured measurement line patterns.

The intersection extraction unit 15 extracts the intersection points at which the captured measurement line patterns and captured reference line patterns extracted by the pattern extraction unit 14 intersect with each other.

The information obtaining unit 16 detects the presence/absence of displacements of respective portions of each of the captured reference lines in the reference line pattern and the directions of these displacements, based on the captured reference lines extracted by the pattern extraction unit 14 and the intersection points extracted by the intersection extraction unit 15. The information obtaining unit 16 obtains information which holds the detected displacements and the one- or two-dimensional positions of the displaced portions. This information is used to identify the captured measurement line pattern (this information will be referred to as identification information hereinafter).

The pattern associating unit 17 associates the projected measurement lines and the captured measurement lines with each other based on the identification information obtained by the information obtaining unit 16. More specifically, first, the pattern associating unit 17 associates the projected reference lines and the captured reference lines with each other based on the information including the identification information. Based on the association result, the pattern associating unit 17 associates the projected measurement lines and the captured measurement lines with each other.

The three-dimensional shape calculation unit 18 calculates the depth between the image capturing unit 13 and the object 20, that is, the three-dimensional shape of the object 20, based on the positional relationship between the projection unit 11 and the image capturing unit 13, and the association relationship between the measurement lines associated with each other by the pattern associating unit 17.

Although an example of the functional configuration of the information processing apparatus 10 has been given above, the configuration of the information processing apparatus 10 described herein is merely an example, and the present invention is not limited to this. For example, the projection unit 11 and image capturing unit 13 need not always be provided as constituent elements of the information processing apparatus 10. That is, the information processing apparatus 10 may be configured to output the pattern data to the projection unit 11 and input the image captured by the image capturing unit 13.

An example of the sequence of the operation of the information processing apparatus 10 shown in FIG. 1 will be described next with reference to FIG. 2.

[S101]

The information processing apparatus 10 causes the pattern generation unit 12 to generate pattern data used for projection pattern light. The pattern data includes a grid pattern in which a plurality of measurement lines 31 intersect with one or a plurality of reference lines 32, as shown in, for example, FIG. 3A. In this case, the measurement lines 31 correspond to horizontal lines, and the reference lines 32 correspond to vertical lines.

Identification numbers used to uniquely identify respective line segments are assigned to the measurement lines 31 in ascending order from the upper side in FIG. 3A as projection ID numbers (K=0, 1, 2, . . . , $K_{max}$). Identification numbers used to uniquely identify respective line segments are assigned to the reference lines 32 in ascending order from the left side in FIG. 3A as projection ID numbers (L=0, 1, 2, . . . , $L_{max}$).

Figure 3B:
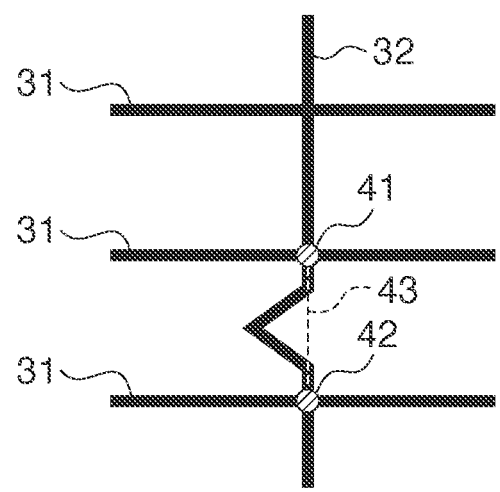

The reference line 32 has a specific feature or characteristic shape formed via a linear or polygonal linear horizontal displacement for each region which is formed between two adjacent measurement lines and divided between intersection points (intersection points 41 and 42) on the reference line pattern 32, as shown in FIG. 3B. A straight line with no displacement with respect to a straight line 43 which connects the intersection points 41 and 42 to each other is defined as "0", a polygonal line displaced leftward with respect to the straight line 43 is defined as "1", and a polygonal line displaced rightward with respect to the straight line 43 is defined as "2". These three unit codes are added to the reference lines 32.

In case of FIG. 3B, projection code information H has "1" because of the presence of a polygonal line displaced leftward. The projection code information H is present for each region surrounded by two adjacent intersection points. The projection code information H is represented by an array including each reference line pattern 32 (l=0, 1, 2, ..., $L_{max}$) and the number $K_{max}$-1 of measurement lines 31 which intersect with this reference line pattern 32. This array (projection code sequence) forms projection code information $H_{la}$ (a=0, 1, 2, ..., $K_{max}$-1). Because the plurality of measurement lines 31 must be uniquely identified using the projection code sequence, the projection code sequence used desirably has a feature that it has a sharp autocorrelation peak and a low degree of cross-correlation with code sequences other than itself.

A case in which a natural random number sequence with a value that falls within the range of "0" to "2" is used as a projection code sequence with the foregoing characteristics will be taken as an example in this embodiment. To facilitate separation and extraction of the reference line pattern 32 and the measurement line pattern 31, these patterns contain, for example, different color components. A case in which the reference line pattern 32 contains a red component and the measurement line pattern 31 contains a blue component will be taken as an example in this embodiment.

[S102 & S103]

Figure 4A:
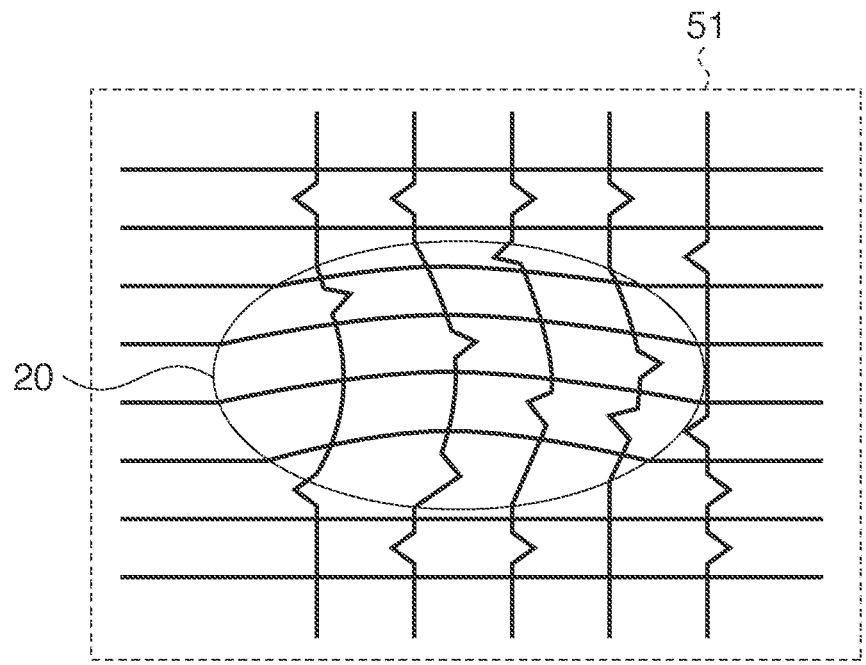
FIGS. 4A and 4B are views showing an example of a captured image in accordance with the present invention.

The information processing apparatus 10 causes the projection unit 11 to project projection pattern light onto the object 20 using the pattern data generated in the process of step S101. The information processing apparatus 10 causes the image capturing unit 13 to capture an image of the object 20 onto which the projection pattern light is projected. Thus, a captured image 51 shown in FIG. 4A is obtained.

[S104]

Figure 4B:
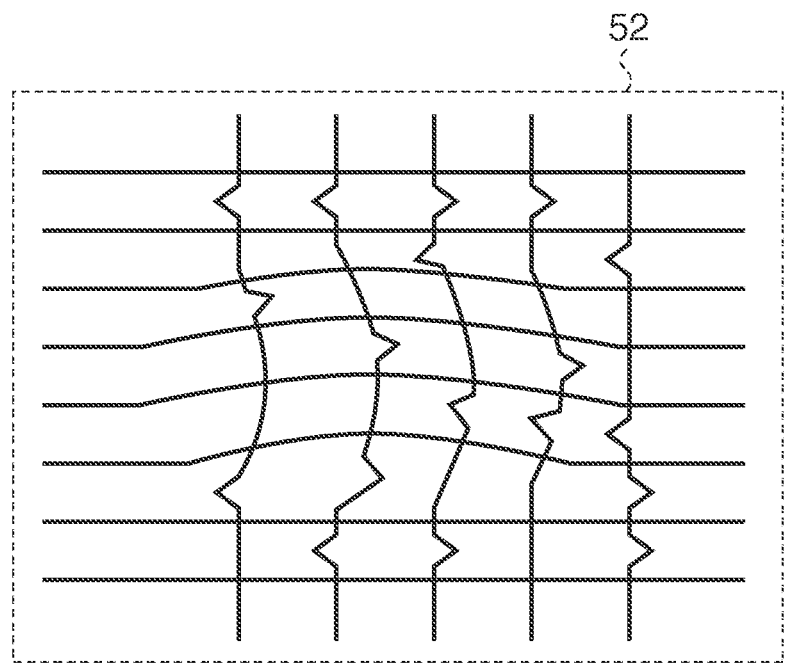

The information processing apparatus 10 causes the pattern extraction unit 14 to extract a captured pattern including the projection pattern and the object 20 from the captured image 51. More specifically, as shown in FIG. 4B, a region which is defined on the object 20 and irradiated with the projection pattern light is extracted from the captured image 51, obtained in the process of step S103, as a captured pattern 52.

Figure 5A:
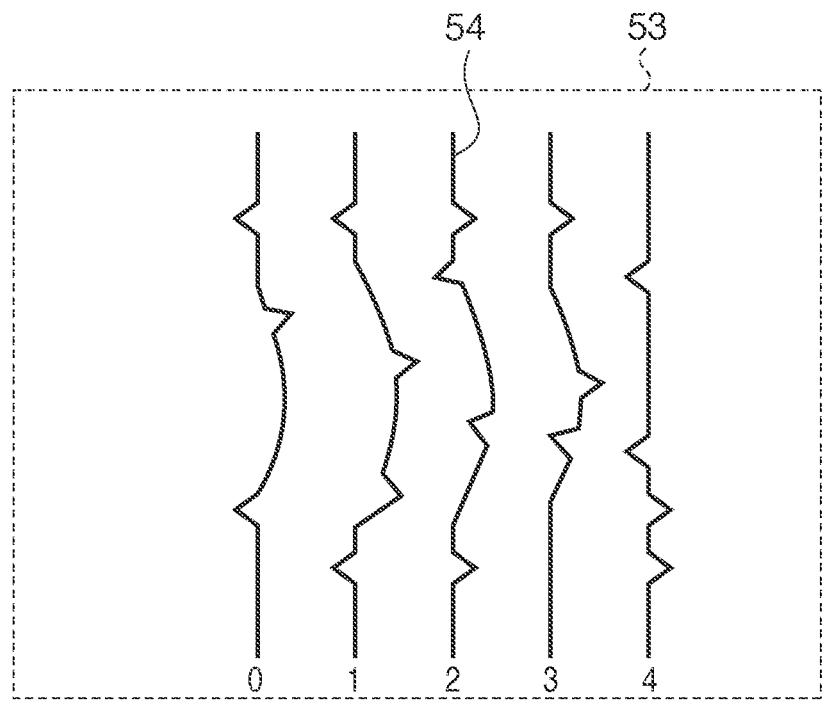
FIGS. 5A and 5B are views showing an example of an overview of extraction processing by a pattern extraction unit 14.
Figure 5B:
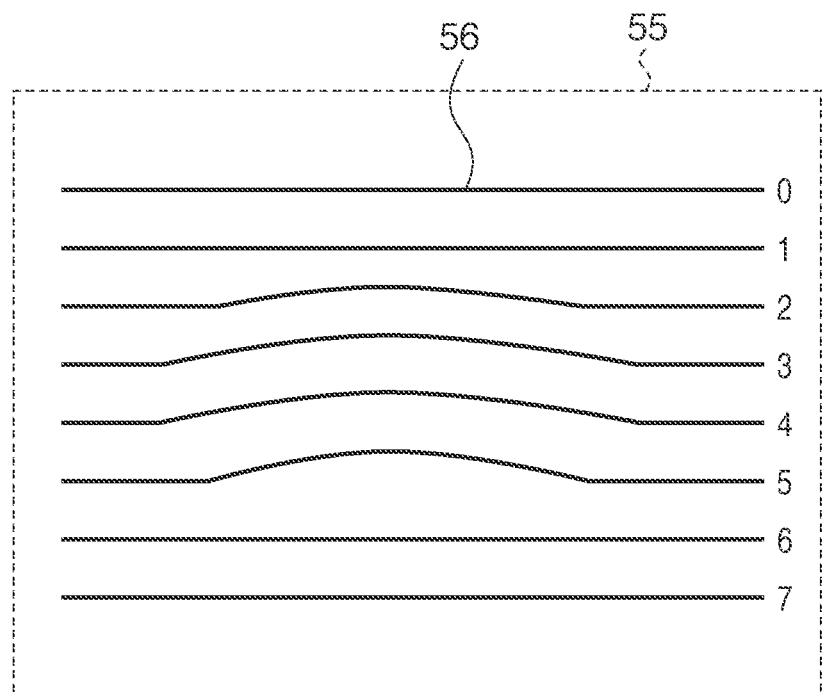

In this extraction processing, first, only a captured pattern 53 of reference lines (red components) is selected, and undergoes binarization processing, as shown in FIG. 5A. Thus, captured reference line patterns 54 are extracted. Similarly, only a captured pattern 55 of measurement line patterns (blue components) is selected, and undergoes binarization processing, as shown in FIG. 5B. Thus, captured measurement lines 56 are extracted. The separated and extracted, captured measurement lines 56 and captured reference lines 54 are labeled with continuous regions. By this labeling, image capturing ID numbers (m=0, 1, 2, ..., $M_{max}$) which are unique to respective regions are assigned to the captured measurement lines 56. Also, image capturing ID numbers (n=0, 1, 2, ..., $N_{max}$) which are unique to respective regions are assigned to the captured reference lines 54.

[S105]

Figure 6:
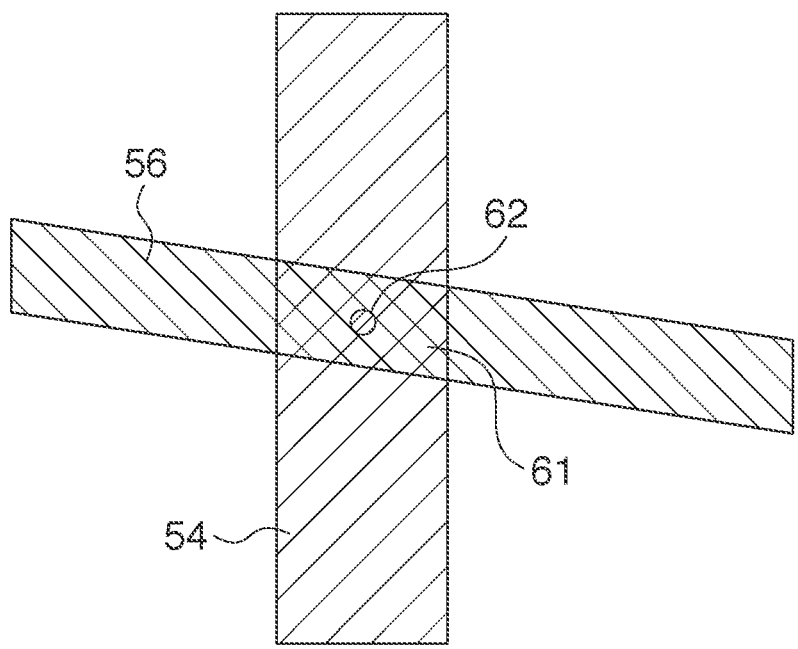
FIG. 6 is a view showing an example of an overview of intersection extraction processing by an intersection extraction unit 15.

The information processing apparatus 10 causes the intersection extraction unit 15 to extract, as an intersection point, a region in which the captured measurement line pattern and the captured reference line pattern intersect with each other. The captured measurement line pattern 56 and captured reference line pattern 54 have given widths, as shown in FIG. 6.

Accordingly, an intersection region 61 in which these two lines intersect with each other has a given area. The information processing apparatus 10 causes the intersection extraction unit 15 to compute the barycentric position of the intersection region 61 and extract it as an intersection point 62.

[S106]

After the extraction of the intersection point 62 is completed, the information processing apparatus 10 causes the information obtaining unit 16 to obtain image capturing code information I added to the captured reference line pattern, using the captured reference line pattern extracted in the process of step S104 and the intersection point extracted in the process of step S105. An example of the sequence of processing for obtaining the image capturing code information I will be described herein with reference to FIG. 7.

[S201 & S202]

First, the information obtaining unit 16 sets n indicating the image capturing ID number of a captured reference line pattern to be processed to an initial value (zero in this case). The information obtaining unit 16 selects a captured reference line pattern with an image capturing ID number n, and divides the nth captured reference line pattern for each intersection point with the captured measurement line pattern. Thus, the nth captured reference line pattern is divided into a plurality of line segments $S_{nb}$ (b=0, 1, 2, ..., $M_{max}$-1). Note that $M_{max}$ indicates the number of captured measurement lines.

[S203]

Figure 8:
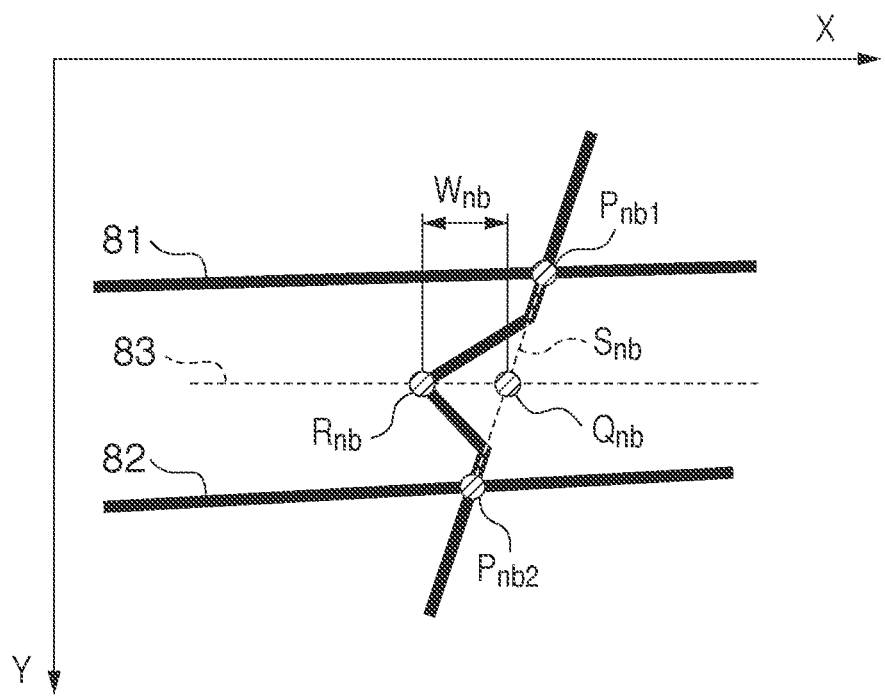
FIG. 8 is a view showing an example of a displacement in a reference line.

The information obtaining unit 16 computes a displacement $W_{nb}$ of each region on the line segment $S_{nb}$. FIG. 8 shows an example of the line segment $S_{nb}$ of a certain captured reference line pattern and its surrounding region.

The positions of points at the two ends of the line segment $S_{nb}$ in the captured reference line pattern, that is, intersection points with (adjacent) captured measurement lines 81 and 82 are defined as intersection points $P_{nb1}$ and $P_{nb2}$, respectively. The midpoint between the intersection points is defined as a midpoint $Q_{nb}$, and a straight line which is parallel to the X-axis and passes through the midpoint $Q_{nb}$ is defined as a parallel line 83. Also, the intersection point between the parallel line 83 and the line segment $S_{nb}$ in the captured reference line pattern is defined as an intersection point $R_{nb}$. In this case, the difference in position between the midpoint $Q_{nb}$ and the intersection point $R_{nb}$ on the parallel line 83 becomes the displacement $W_{nb}$ on the line segment $S_{nb}$. Displacements $W_{nb}$ are calculated for all regions (that is, b (b=0, 1, 2, ..., $M_{max}$-1)) on the line segment $S_{nb}$.

[S204]

When the displacement $W_{nb}$ of each region is obtained, the information obtaining unit 16 calculates pieces of image capturing code information $I_{nb}$ for all regions (that is, b (b=0, 1, 2, ..., $M_{max}$-1)) on the line segment $S_{nb}$ using:

$$\begin{cases} I_{nb} = 0 (W_{nb} \geq -\text{Threshold} \cap W_{nb} \leq \text{Threshold}) \\ I_{nb} = 1 (W_{nb} > \text{Threshold}) \\ I_{nb} = 2 (W_{nb} < -\text{Threshold}) \end{cases} \quad (1)$$

where Threshold is the threshold which serves as a determination criterion for determining the image capturing code information $I_{nb}$. Based on the threshold, the value of each displacement $W_{nb}$ ("0" to "2" in this embodiment) is obtained.

[S205 & S206]

The information obtaining unit 16 increments n by one, and compares n and the maximum value ($N_{max}$) of the image capturing ID number of the captured reference line pattern with each other. If n≥N$_{max}$, this processing ends; otherwise, the process returns to step S202 again. Note that the image capturing code information I$_{nb}$ (b=0, 1, 2, ..., M$_{max}$–1 and n=0, 1, 2, ..., N$_{max}$) of each region is used as the identification information of the captured measurement line pattern.

[S107]

Referring back to FIG. 2, the information processing apparatus 10 causes the pattern associating unit 17 to associate the captured reference lines and the projected reference lines with each other. More specifically, the image capturing ID numbers of the captured reference lines 54 shown in FIG. 5A and the projection ID numbers of the reference lines 32 shown in FIG. 3A are associated with each other. This association is based on the captured reference lines extracted by the pattern extraction unit 14, the image capturing code information I$_{nb}$ obtained by the information obtaining unit 16, and the projection code information H$_{la}$ used for the pattern data. An example of the sequence of processing of associating the reference lines with each other will be described with reference to FIG. 9. A case in which association is performed by searching for an image capturing ID number N$_{ref}$ of a captured reference line pattern corresponding to each (projected) reference line pattern will be explained herein.

[S301 & S302]

The pattern associating unit 17 sets the variable n indicating the image capturing ID number of a captured reference line pattern to be processed to an initial value (zero in this case), and sets the maximum correlation value C$_{max}$ to an initial value (zero in this case).

[S303]

The pattern associating unit 17 computes a correlation coefficient C$_n$ between the image capturing code information I$_{nb}$ computed in the process of step S106 shown in FIG. 2 and projection code information H$_{refb}$ (b=0, 1, 2, ..., M$_{max}$–1) using:

$$C_n = \frac{\sum_{b=0}^{M_{max}-1}(I_{nb} - \overline{I_n})(H_{refb} - \overline{H_{ref}})}{\sqrt{\sum_{b=0}^{M_{max}-1}(I_{nb} - \overline{I_n})^2}\sqrt{\sum_{b=0}^{M_{max}-1}(H_{refb} - \overline{H_{ref}})^2}} \quad (2)$$

where $\overline{I_n}$ and $\overline{H_{ref}}$ are the arithmetic means of all elements within the ranges of I$_{nb}$ and H$_{refb}$ (b=0, 1, 2, ..., M$_{max}$–1), respectively.

In practice, the numbers of elements a and b of projection code information H$_{refa}$ (a=0, 1, 2, ..., K$_{max}$–1) and the image capturing code information I$_{nb}$ (b=0, 1, 2, ..., M$_{max}$–1), respectively, are not always the same. For the sake of descriptive convenience, a case in which a correlation coefficient is computed assuming that b=a will be taken as an example herein.

[S304, S305, & S306]

The pattern associating unit 17 compares C$_n$ and C$_{max}$. If C$_n$>>C$_{max}$, the process advances to steps S305 and S306, in which C$_n$ is substituted for C$_{max}$, and n is substituted for N$_{ref}$. Otherwise, the process directly advances to step S307.

[S307 & S308]

The pattern associating unit 17 increments n by one, and compares n and the maximum value (N$_{max}$) of the image capturing ID number of the captured reference line pattern with each other. If n≥N$_{max}$, this processing ends; otherwise, the process returns to step S303 again. By repeating the above-mentioned processing, the image capturing ID number N$_{ref}$ of a captured reference line pattern corresponding to each reference line pattern to which the projection code information H$_{ref}$ is added.

[S108]

Referring back to FIG. 2, the information processing apparatus 10 causes the pattern associating unit 17 to associate the captured reference lines and the projected reference lines with each other. More specifically, the image capturing ID numbers of the captured measurement lines 56 shown in FIG. 5B and the projection ID numbers of the projected measurement lines 31 shown in FIG. 3A are associated with each other.

In the process of step S107, the image capturing ID numbers N$_{ref}$ are associated with the (projected) reference lines. Hence, in the process of step S107, the captured measurement lines are associated with the projected measurement lines based on a topological positional relationship established by the intersection points between the captured measurement lines and the already associated captured reference lines.

Figure 10:
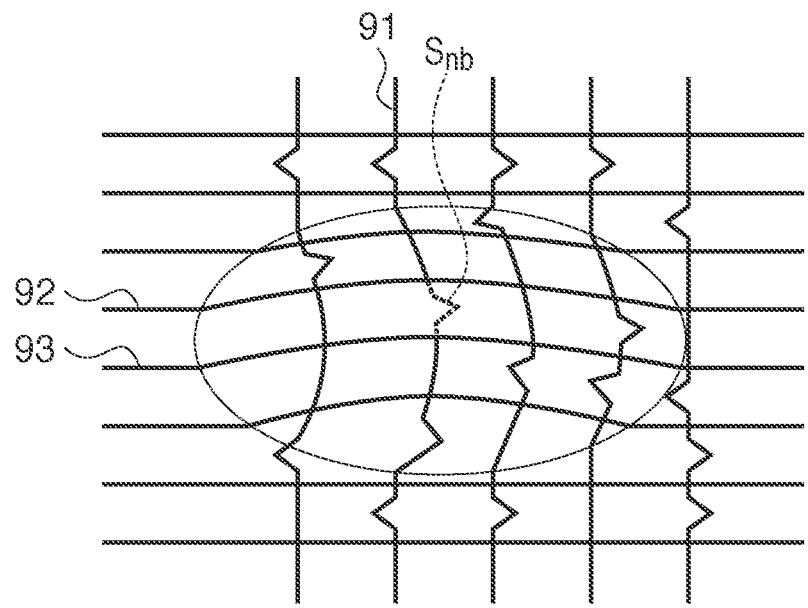
FIG. 10 is a view showing an example of an overview of association processing by the pattern associating unit 17.

As described above, the captured reference line pattern is divided in the plurality of line segments S$_{nb}$ (see step S202 in FIG. 7), so the projection ID numbers of the captured measurement lines which intersect with it can be uniquely decided. For example, as shown in FIG. 10, a captured measurement line pattern 92 (a measurement line pattern on the upper side in FIG. 10) which intersects with an arbitrary line segment S$_{nb}$ in a captured reference line pattern 91 has a projection ID number b. Also, a captured measurement line pattern 93 (a measurement line pattern on the lower side in FIG. 10) which intersects with the arbitrary line segment S$_{nb}$ has a projection ID number b+1.

Figure 11:
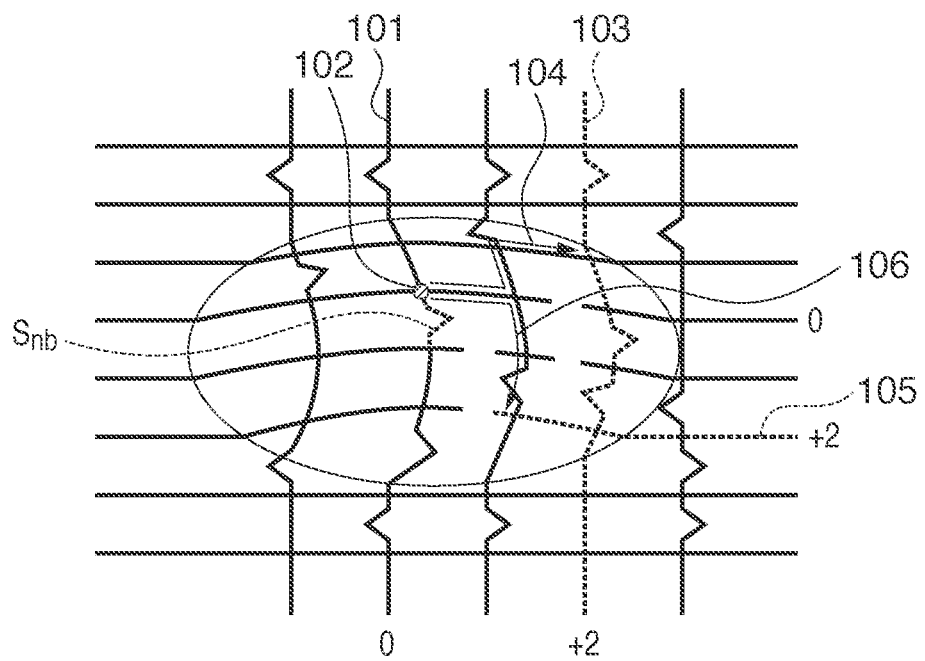
FIG. 11 is a view showing the example of an overview of association processing by the pattern associating unit 17.

As shown in FIG. 11, a point (on the upper side in FIG. 11) on an arbitrary line segment S$_{nb}$ in an already associated captured reference line pattern 101 is defined as a reference position 102. Upon tracing a route formed by the intersection points on the line segments from the reference position 102, an arbitrary captured measurement line pattern can be reached even if the captured pattern is discontinuous due to, for example, noise or steps. At this time, the vertical and horizontal moving amounts for each line are counted.

The captured reference line pattern 101 is an already associated pattern, and a captured reference line pattern 103 is a pattern to be associated. In this case, as can be seen by tracing a route 104 from the point (reference position) 102 (on the upper side in FIG. 11) on the line segment S$_{nb}$, the captured reference line pattern 103 is at a position horizontally moved by +2 from the already associated captured reference line pattern 101. Also, as can be seen by tracing a route 106 from the point (reference position) 102, a captured measurement line pattern 105 to be associated is at a position vertically moved by +2 from the point (reference position) 102.

The already associated captured reference line pattern 101 has a projection ID number N=2, and the line segment S$_{nb}$ has b=3. In this case, based on these pieces of information associated with a reference line pattern, and the moving amount from the reference line pattern, the captured reference line pattern 103 is found to have a projection ID number N=4, and the captured measurement line pattern 105 is found to have a projection ID number M=5.

In this way, the captured measurement lines to be associated are associated with the projected measurement lines, and captured reference lines which have not yet been associated in the process of step S107 in FIG. 2 are associated at the same time. This makes it possible to increase the number of points that can be used as reference positions. This processing is performed for all captured reference lines to be associated and all captured measurement lines to be associated. Thus, the projection ID numbers are associated with the image capturing ID numbers of all captured measurement lines.

[S109]

Figure 12:
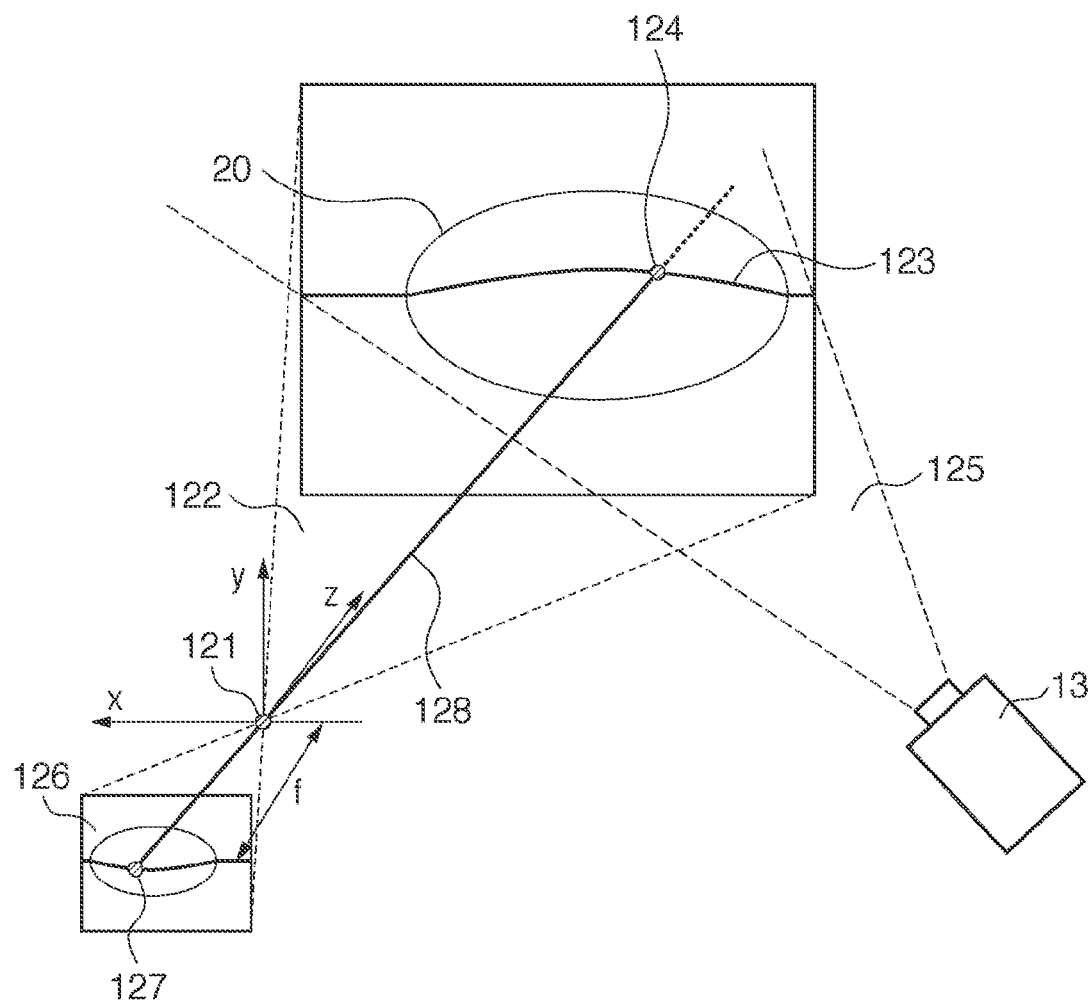
FIG. 12 is a view showing an example of an overview of three-dimensional shape calculation processing by a three-dimensional shape calculation unit 18.

The information processing apparatus 10 causes the three-dimensional shape calculation unit 18 to calculate (measure) the shape of the object 20 based on the already associated captured measurement lines. An example of an overview of three-dimensional shape calculation processing will be described with reference to FIG. 12. A case in which the position of an arbitrary measurement point 124 on an already associated captured measurement line pattern 123 is measured using a coordinate system 122 which is defined on the image capturing unit 13 and uses a principal point position 121 of the image capturing unit 13 as the origin (0, 0) will be exemplified herein.

When the projected measurement line pattern projected by the projection unit 11 is assumed to be a straight line, the already associated captured measurement line pattern 123 is the intersection line between the object 20 and a plane formed by the projected measurement lines. Note that a light-section plane 125 formed by the projected measurement lines is calibrated in advance using the coordinate system on the image capturing unit 13 in accordance with:

$$ax+by+cz+d=0 \qquad (3)$$

Also, points which form the already associated captured measurement line pattern 123 are present on a straight line 128 described using a position P ($P_X$, $P_Y$, −f) of a projection point 127 on a captured image 126, captured by the image capturing unit 13, in accordance with:

$$x = -\frac{P_x}{f}t \qquad (4)$$
$$y = -\frac{P_y}{f}t$$
$$z = t$$

where t is a parameter which takes an arbitrary real number. Note that the captured image 126 has an actual size equal to that of a projected image on an image sensing element assuming the image capturing unit 13 as a pinhole camera. Also, the captured image 126 is parallel to the X-Y plane in the coordinate system on the image capturing unit 13 and is placed at a position at which its center is spaced apart from the origin position by a focal length −f in the Z-axis direction.

The intersection point between the light-section plane 125 presented in equation (3) and the straight line 128 presented in equations (4) is the measurement point 124. Accordingly, a position C ($C_x$, $C_y$, $C_z$) of the measurement point 124 is given in the coordinate system on the image capturing unit 13 by:

$$C_x = -\frac{dP_x}{aP_x + bP_y - cf} \qquad (5)$$
$$C_y = -\frac{dP_y}{aP_x + bP_y - cf}$$
$$C_z = \frac{df}{aP_x + bP_y - cf}$$

The above-mentioned computation is performed for all already associated captured measurement lines 123. Based on a set of measurement points 124 obtained in this way, the shape of the object 20 is obtained. By executing the foregoing procedure, a grid pattern can be projected with a density higher than that attained by the conventional method.

As has been described above, according to this embodiment, a projection pattern for use in three-dimensional measurement of an object can be projected at a higher density, thus improving the accuracy of measuring the three-dimensional shape.

Although an embodiment of the present invention has been given above, the present invention is not limited to the embodiment which has been described above and shown in the accompanying drawings, and can be modified as needed without departing from the scope of the present invention.

In, for example, generating pattern data by the pattern generation unit 12 (S101 in FIG. 2), new pattern data need not always be generated each time. The pattern data generated once may be stored using a storage means and read out from the storage means when the need arises next. This configuration can speed up the processing when, for example, an object to be captured is limited and optimum pattern data is decided in advance.

Figure 7:
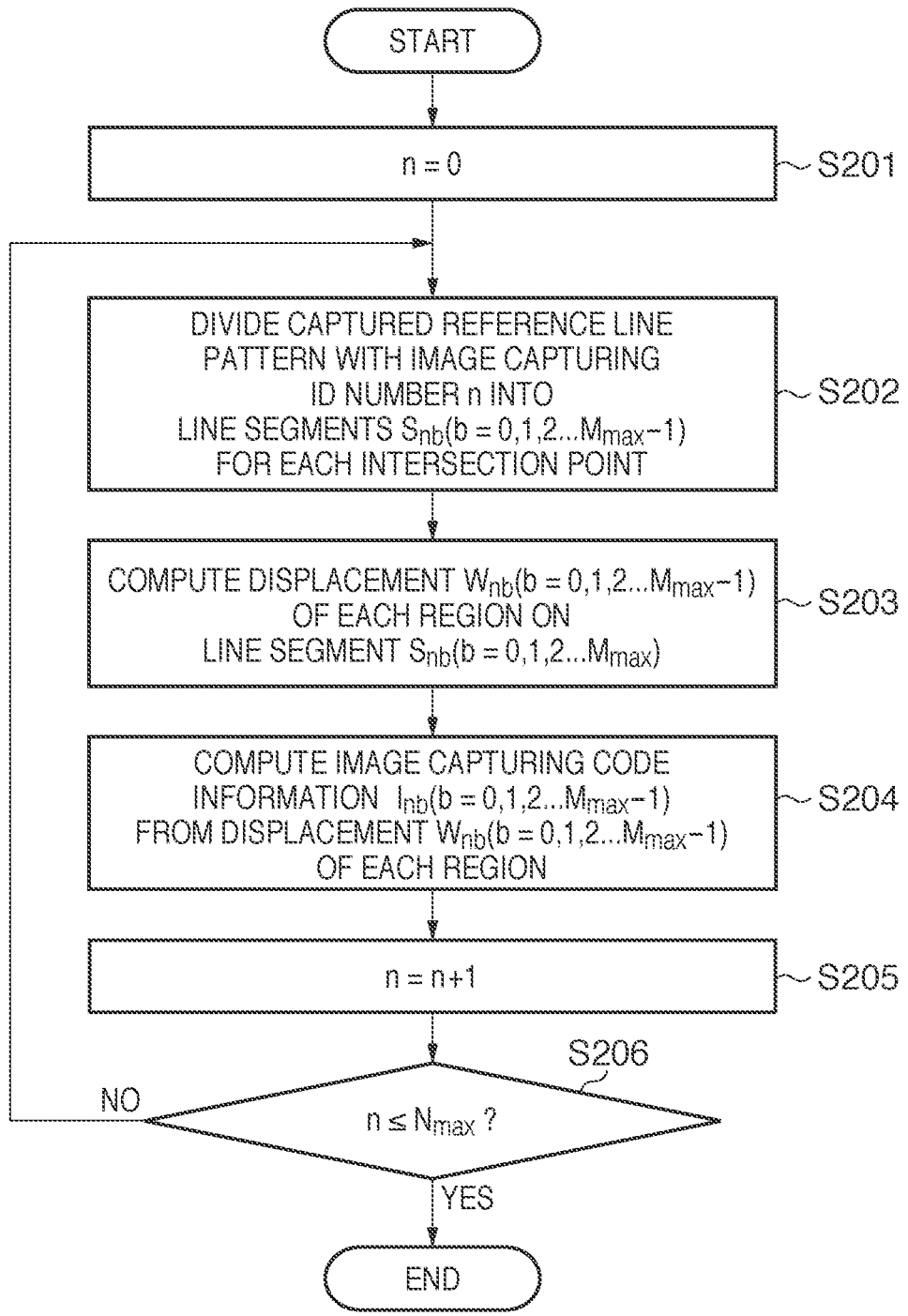
FIG. 7 is a flowchart showing an example of the sequence of processing by an information obtaining unit 16.

The computation of the displacement $W_{nb}$ on the line segment $S_{nb}$ is performed in the process of step S203 in FIG. 7 assuming that the line segment $S_{nb}$ and the adjacent intersection points $P_{nb1}$ and $P_{nb2}$ are present on the same plane. On this assumption, a target object is limited to a physical object with certain degrees of flatness and continuity. To reduce this limit, it is desirable to project the projected reference lines to fall within the same plane as straight lines formed by the principal points of both the image capturing unit 13 and the projection unit 11 or approximately fall within this plane, thereby capturing an image without changing a displacement in the projected reference line pattern as much as possible.

Figure 13:
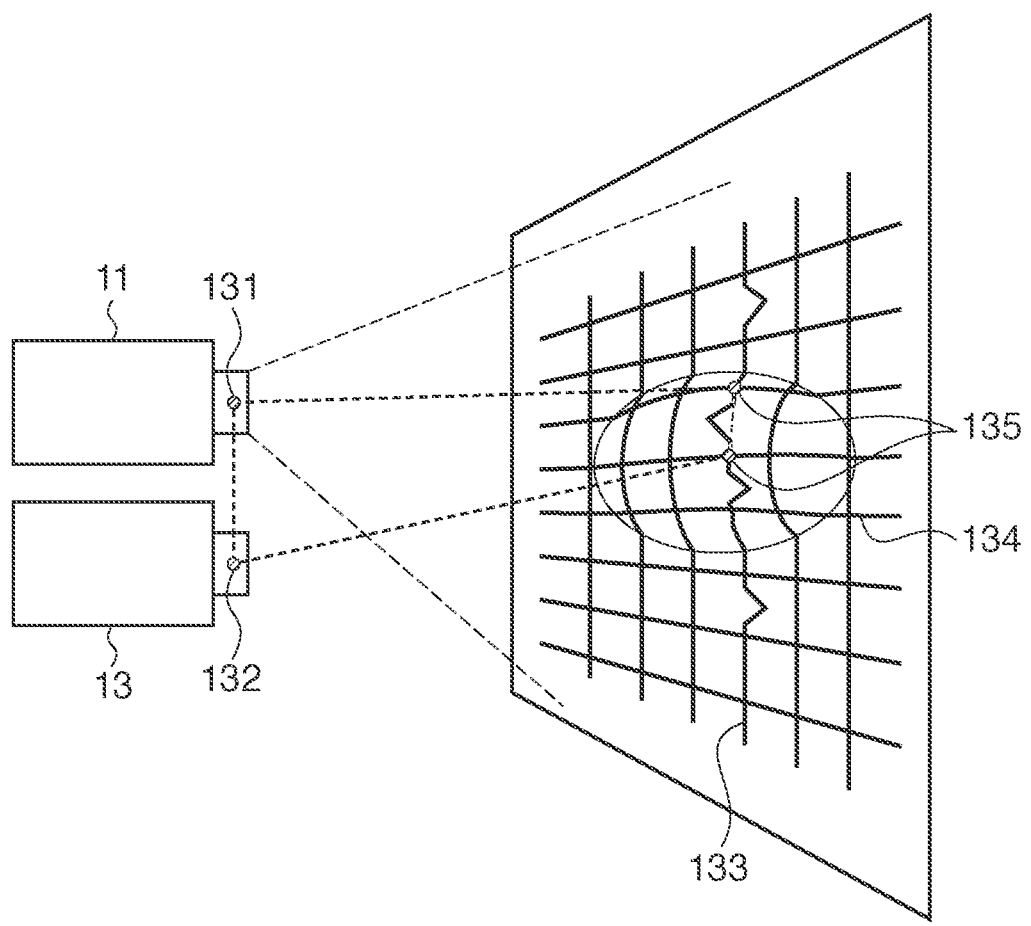
FIG. 13 is a view showing an example of the positional relationship between a projection unit 11 and an image capturing unit 13.

As shown in FIG. 13, a layout in which the optical axes of the projection unit 11 and image capturing unit 13 are parallel to each other, and a principal point 131 of the projection unit 11, a principal point 132 of the image capturing unit 13, and an intersection point 135 between a projected reference line pattern 133 and a projected measurement line pattern 134 fall within the same plane is especially desirable. In such a layout, the displacement $W_{nb}$ on the line segment $S_{nb}$ always has a constant value independently of the tilt and depth of the object. Although one of three types of code information: no displacement, a leftward displacement, and a rightward displacement is added to each projected reference line pattern in the above description, such a layout allows the use of not only the presence/absence of a displacement but also the amount of displacement (a predetermined amount of displacement) as code information because the displacement $W_{nb}$ always has a constant value. When the amount of displacement is used as code information, it is desirably discretized without causing erroneous detection, based on conditions such as the layout and resolutions of the projection unit and image capturing unit.

Figure 14:
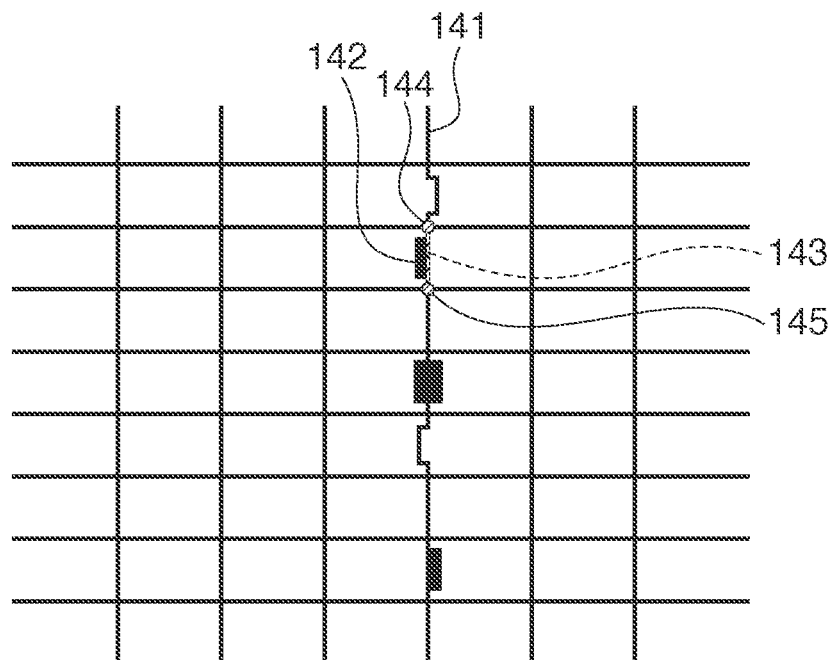
FIG. 14 is a view showing an example of pattern data in accordance with the present invention.

In this embodiment, as shown in FIG. 3A, a reference line pattern is formed by a polygonal line with a constant width and is therefore easily detected with less variation in luminance upon being projected onto the object, but the reference line pattern is not limited to this. When, for example, addition of code information has high priority, projection pattern light with an inconstant width may be used, as shown in FIG. 14. In case of FIG. 14, a reference line pattern 141 has displacements corresponding to the displacement $W_{nb}$ on its both right edge 142 and left edge 143. In this case, the right edge 142 and left edge 143 have five types of displacements: 1. right/right, 2. right/none, 3. none/none, 4. none/left, 5. left/left (right: rightward displacement; left: leftward displacement; and none: no displacement) with respect to a straight line which connects intersection points 144 and 145 to each other. This makes it possible to add a larger number of types of code information than in the above-described embodiment (three types). Upon adding a larger number of types of code information, a code sequence which has a sharper autocorrelation peak and a lower degree of cross-correlation with code sequences other than itself can be used as pattern data, thus improving the capability of associating the reference lines with each other.

Figure 15:
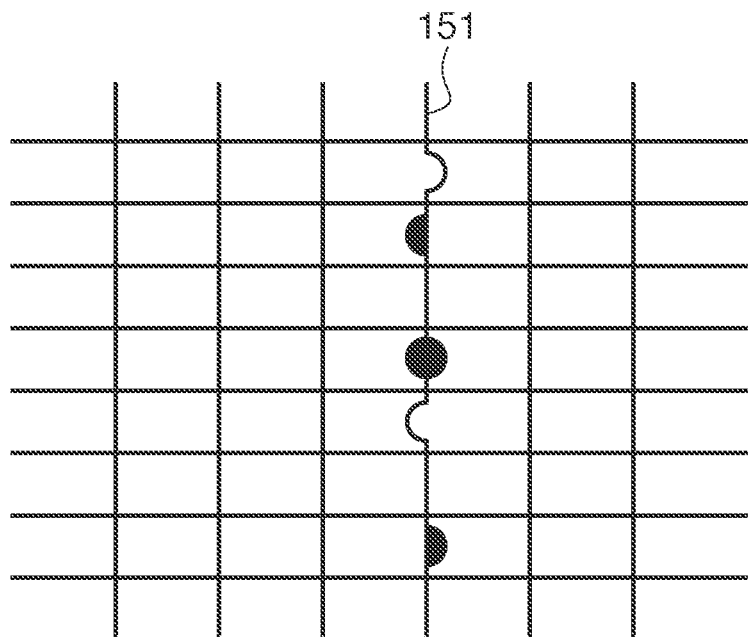
FIG. 15 is a view showing another example of pattern data in accordance with the present invention.

Also, because projection pattern light need not have a constant width in case of FIG. 14, a reference line pattern 151 as shown in FIG. 15 may be adopted. By moderating displacements on the left and right edges in this way, a captured pattern with no discontinuities can be more reliably extracted in the process of step S104 in FIG. 2.

As described above, a code sequence used for the projection code information $H_{la}$ ($a=0, 1, 2, \ldots, K_{max}-1$) of the pattern data exerts a great influence on the performance of associating the captured reference lines. The performance can be improved not only by adding a larger number of types of projection code information but also by using a more appropriate code sequence. Although a natural random number sequence is used as the code sequence of the pattern data, it may be substituted by, for example, an M-sequence or de Bruijn sequence with pseudorandom characteristics. These pseudorandom sequences have a feature that they have completely known autocorrelation/cross-correlation characteristics. The use of these sequences allows more satisfactory, reliable association of the captured reference lines under the condition in which a code sequence with a sufficient length can be used or that in which the association candidate n ($n=0, 1, 2, \ldots, N_{max}$) shown in FIG. 9 can be reduced by limiting the depth range to be captured.

Also, in the above-described embodiment, measurement lines with different IDs have different code sequences used for the projection code information $H_{la}$ ($a=0, 1, 2, \ldots, K_{max}-1$) of the pattern data, thus obtaining two-dimensional positional information. However, the present invention is not limited to this, and the same code sequence may be used for all measurement lines by simplifying the code sequence used in the above-described embodiment when only one-dimensional positional information indicating the upper and lower positional relationships between the measurement lines is necessary. Such simplification can speed up the computation.

Figure 9:
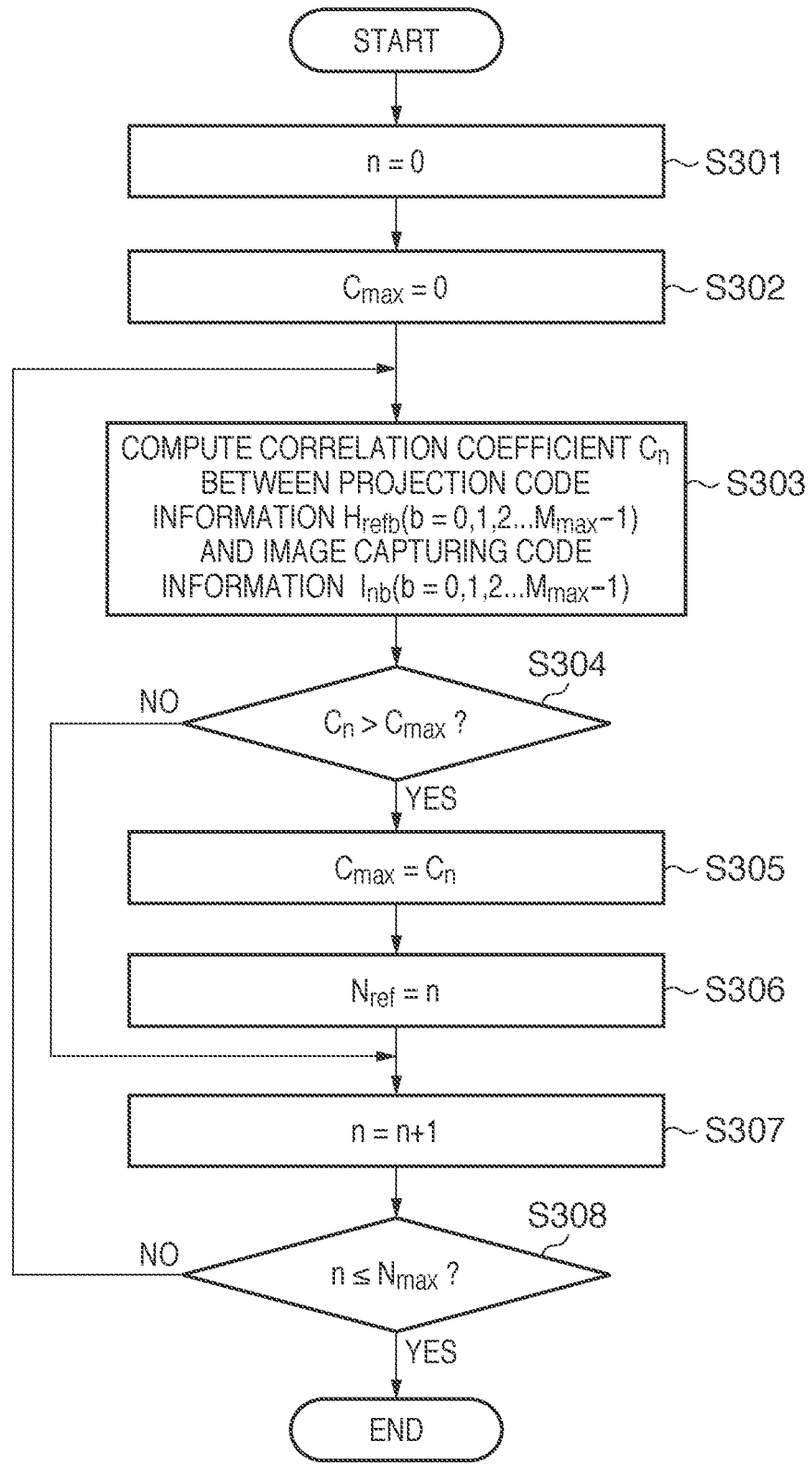
FIG. 9 is a flowchart showing an example of the sequence of processing by a pattern associating unit 17.

Moreover, in the process of step S303 in FIG. 9, the numbers of elements of the projection code information $H_{refa}$ ($a=0, 1, 2, \ldots, K_{max}-1$) and the image capturing code information $I_{nb}$ ($b=0, 1, 2, \ldots, M_{max}-1$) are assumed to be b=a. However, the number $M_{max}$ of actual captured measurement lines is not always equal to the number $K_{max}$ of projected measurement lines. Due to the influence of, for example, noise or shielding by the projections and grooves of the object at the time of image capture, it is often the case that $M_{max} \neq K_{max}$. In this case, the correlation coefficient cannot be precisely computed using equation (2), so the association may fail. To combat this situation, matching which adopts, for example, dynamic programming that allows computation using arrays including different numbers of elements may be performed instead of using equation (2).

The present invention can be embodied as, for example, a system, an apparatus, a method, a program, or a storage medium. More specifically, the present invention may be applied to a system including a plurality of devices or an apparatus including only one device.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-053669 filed on Mar. 10, 2010, which is hereby incorporated by reference herein in its entirety.

What is claimed is:

1. An information processing apparatus comprising:
   an obtaining unit arranged to obtain pattern data including a plurality of measurement lines and a reference line which has a plurality of intersection points with the plurality of measurement lines, wherein the reference line has a specific feature defined by a pattern having displacement on a line which connects two of the intersection points;
   an image capturing unit configured to capture an image of an object onto which projection pattern light, based on the pattern data obtained by the obtaining unit, is projected;
   an intersection extraction unit configured to extract the intersection points from the image captured by the image capturing unit; and
   an information obtaining unit configured to obtain identification information which is used to identify each measurement line in the plurality of measurement lines, based on the specific feature.

2. The apparatus according to claim 1, wherein the obtaining unit is configured to obtain pattern data including a plurality of reference lines, each of which is arranged to have a plurality of intersection points with the plurality of measurement lines.

3. The apparatus according to claim 1, further comprising an associating unit configured to associate the reference line in the pattern data and the reference line in the captured image with each other, based on the identification information obtained by the information obtaining unit, and associate the measurement lines in the pattern data and the measurement lines in the captured image with each other based on the result of the association.

4. The apparatus according to claim 3, further comprising a shape calculation unit configured to calculate the three-dimensional shape of the object, based on the positional relationship between a projection unit arranged to project the projection pattern light and the image capturing unit arranged to capture the image of the object onto which the projection pattern light is projected, and an association relationship between the measurement lines in the projection pattern light and the measurement lines in the captured image.

5. The apparatus according to claim 3, wherein
   the measurement line and the reference line each contain different color components, and
   the intersection extraction unit separates and extracts the measurement line and the reference line from the captured image based on the color components, and extracts the intersection points based on the extracted reference and measurement lines.

6. The apparatus according to claim 1, wherein the specific feature has a polygonal linear shape.

7. The apparatus according to claim 1, wherein the specific feature is defined by a direction of displacement on a line which connects the intersection points to each other.

8. The information processing apparatus according to claim 1, wherein the displacement has direction relative to a straight line connecting the two of the intersection points, and the information obtaining unit obtains the identification information based on the direction of the displacement.

9. The information processing apparatus according to claim 1, wherein the pattern comprises a non-straight line displacement.

10. The information processing apparatus according to claim 1, further comprising:
a deriving unit configured to derive three dimensional shape information of the object based on the identification information.

11. The information processing apparatus according to claim 10, wherein the deriving unit derives a three dimensional coordinate of the object as the three dimensional shape information.

12. A processing method for an information processing apparatus, comprising:
obtaining pattern data including a plurality of measurement lines and a reference line which has a plurality of intersection points with the plurality of measurement lines, wherein the reference line has a specific feature defined by a pattern having displacement on a line which connects two of the intersection points;
capturing an image of an object onto which projection pattern light based on the pattern data is projected;
extracting the intersection points from the captured image; and
obtaining identification information which is used to identify each measurement line in the plurality of measurement lines, based on the specific feature.

13. The processing method according to claim 12, further comprising:
deriving three dimensional shape information of the object based on the identification information.

14. The processing method according to claim 13, wherein in the deriving, a three dimensional coordinate of the object is derived as the three dimensional shape information.

15. A non-transitory computer-readable storage medium storing a program for causing a computer to execute the processing method according to claim 12.

16. An information processing apparatus comprising:
an image obtaining unit configured to obtain an image of an object onto which a projection pattern is projected, the projection pattern including a plurality of measurement lines and a reference line which has a plurality of intersection points with the plurality of measurement lines, wherein the reference line has a specific feature defined by a pattern having displacement on a line which connects two of the intersection points;
an intersection extraction unit configured to extract the intersection points from the image obtained by the image obtaining unit; and
an information obtaining unit configured to obtain identification information which is used to identify each measurement line in the plurality of measurement lines, based on the specific feature.

17. The information processing apparatus according to claim 16, further comprising:
a deriving unit configured to derive three dimensional shape information of the object based on the identification information.

18. The information processing apparatus according to claim 17, wherein the deriving unit derives a three dimensional coordinate of the object as the three dimensional shape information.

19. A processing method for an information processing apparatus comprising:
obtaining an image of an object onto which a projection pattern is projected, the projection pattern including a plurality of measurement lines and a reference line which has a plurality of intersection points with the plurality of measurement lines, wherein the reference line has a specific feature defined by a pattern having displacement on a line which connects two of the intersection points;
extracting the intersection points from the obtained image; and
obtaining identification information which is used to identify each measurement line in the plurality of measurement lines, based on the specific feature.

20. The processing method according to claim 19, further comprising:
deriving three dimensional shape information of the object based on the identification information.

21. The processing method according to claim 20, wherein in the deriving, a three dimensional coordinate of the object is derived as the three dimensional shape information.

22. A non-transitory computer-readable storage medium storing a program for causing a computer to execute the processing method according to claim 19.

* * * * *